United States Patent [19]
Takeuchi

[11] Patent Number: 6,054,833
[45] Date of Patent: Apr. 25, 2000

[54] DISK DRIVE HAVING IMPROVED HEAD-VELOCITY CONTROL, AND METHOD THEREFOR

[75] Inventor: Kenji Takeuchi, Palo Alto, Calif.

[73] Assignee: Iomega Corporation, Roy, Utah

[21] Appl. No.: 09/307,900

[22] Filed: May 10, 1999

[51] Int. Cl.[7] .................................................. G05D 23/275
[52] U.S. Cl. ....................... 318/638; 318/632; 360/78.07
[58] Field of Search ................... 318/638, 631, 318/632, 626, 568.11, 568.15, 568.16, 568.17; 360/75, 77.01–77.11, 78.04–78.14; 369/44.32, 44.13

[56] References Cited

U.S. PATENT DOCUMENTS

| | | | |
|---|---|---|---|
| 4,864,437 | 9/1989 | Couse et al. | 360/75 |
| 4,933,785 | 6/1990 | Morehouse et al. | 360/78.04 |
| 5,034,837 | 7/1991 | Schmitz | 360/105 |
| 5,235,482 | 8/1993 | Schmitz | 360/97.02 |
| 5,327,059 | 7/1994 | Truong et al. | 318/632 |
| 5,615,064 | 3/1997 | Blank et al. | 360/75 |
| 5,828,522 | 10/1998 | Brown et al. | 360/105 |
| 5,831,786 | 11/1998 | Boutaghou et al. | 360/75 |
| 5,859,358 | 1/1999 | Wood et al. | 73/9 |
| 5,949,612 | 9/1999 | Gudeman et al. | 360/97.01 |
| 5,991,114 | 11/1999 | Huang et al. | 360/75 |

*Primary Examiner*—Robert E. Nappi
*Assistant Examiner*—Rina I. Duda
*Attorney, Agent, or Firm*—Woodcock Washburn Kurtz Mackiewicz & Norris LLP

[57] ABSTRACT

A disk drive has a servo controller that regulates the velocity of a data-transducing head as the head is moved between a parked position and a data-transducing position within the drive. The head is coupled to a suspension arm. The suspension arm is coupled to an actuator motor that produces an output. This output moves the head between the above-noted positions. The suspension arm engages a head-loading ramp within the drive as the head is moved between its parked and data-transducing positions. This engagement generates a frictional force. The controller attenuates variations in the velocity of the head caused by variations in the frictional force. This is accomplished by varying the motor output based on a predetermined relationship between the head velocity and the frictional force.

24 Claims, 4 Drawing Sheets

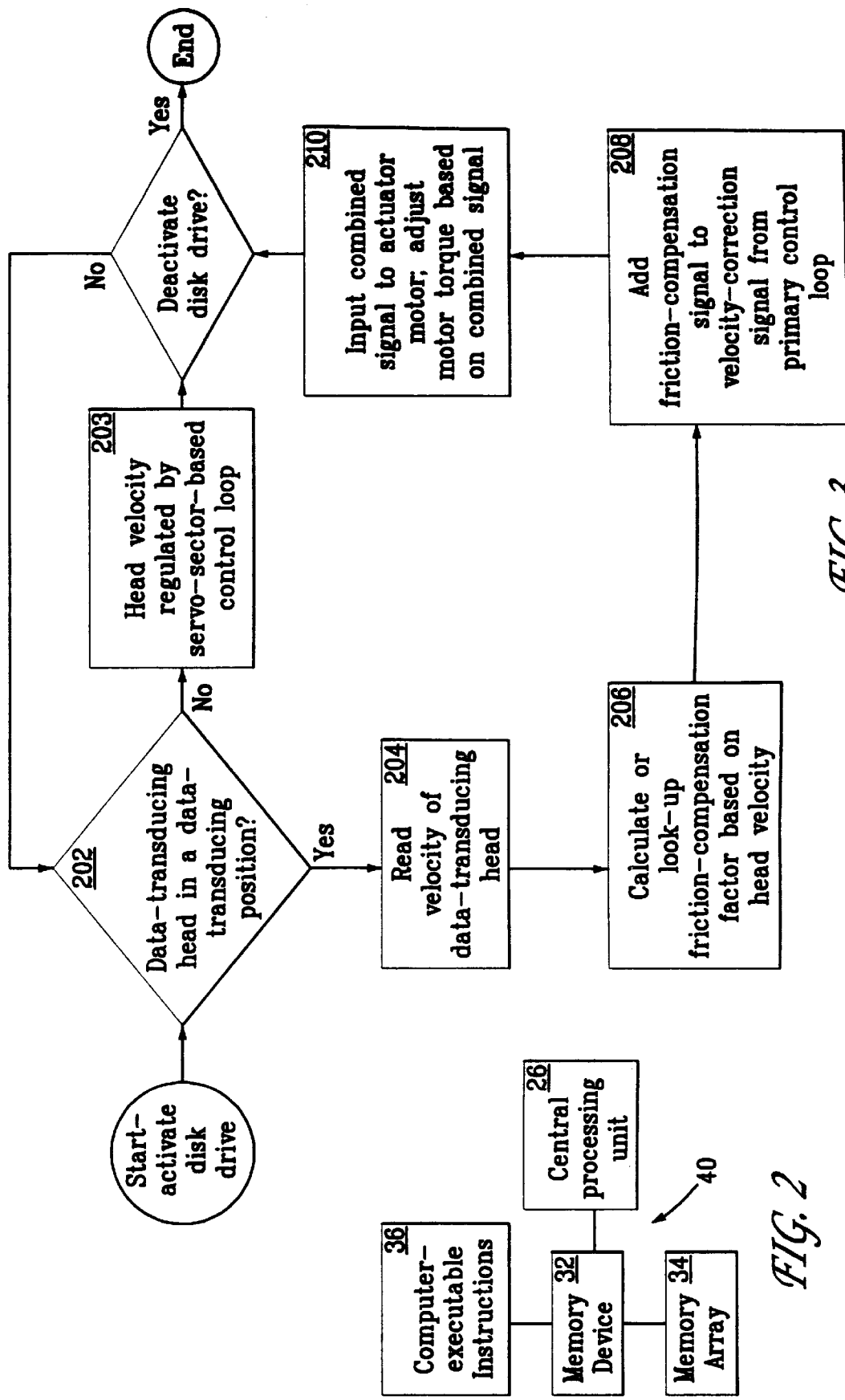

DISK DRIVE HAVING IMPROVED HEAD-VELOCITY CONTROL, AND METHOD THEREFOR

BACKGROUND OF THE INVENTION

Digital information is commonly stored on data-storage disks. Data-storage disks are used in conjunction with some type of disk drive that is adapted to rotate the disk. Disk drives typically comprise a data-transducing head that writes and/or reads information to and from the disk surface as the disk rotates. More particularly, the head writes and/or reads information to and from a series of continuous tracks arranged concentrically about the geometric center of the disk.

The data-transducing head is typically disposed on some type of actuator mechanism. The actuator mechanism positions the head proximate the particular track to or from which data is being written or read, thereby allowing the head to perform its data-transducing function. Positions from which the head can write or read data are referred to throughout the specification and claims as "data transducing positions."

The actuator mechanism usually comprises an actuator arm, a flexure, a suspension arm, and a motor. The head is typically coupled to an end of the flexure via an air-bearing slider. An opposite end of the flexure is affixed to the suspension arm so as to cause the slider and the head to be disposed below the arm. The suspension arm is affixed to the actuator arm. The actuator arm is coupled to the body of the disk drive in a manner that facilitates rotational or, alternatively, linear movement in relation to the data-storage disk. The actuator arm is coupled to the actuator motor, which produces the force that moves the actuator arm. Movement of the actuator arm causes a cooperative movement of the data-transducing head due to the coupling of the head and the actuator arm by way of the suspension arm, the flexure, and the slider. The operation of the actuator motor and, thus, the position and velocity of the data-transducing head, are typically regulated by a servo controller.

The slider and the head are disposed proximate a surface of the data-storage disk when the head is in a data-transducing position, as noted above. The rotation of the disk produces an aerodynamic boundary layer on the surface of the disk. The slider is designed to interact with this boundary layer. More particularly, the shape of the slider causes the slider to be lifted by the boundary later. This lifting action causes the slider to fly above the disk surface at a height typically on the order of several micro-inches.

The actuator mechanism moves the head to a stored, or parked, position at the conclusion of read/write operations within the disk drive. The head may be parked on the surface of the data-storage disk, in an area that is not utilized for data storage. Alternatively, the head can be parked in a position away from the disk surface. The latter storage methodology prevents the slider and the head from contacting the surface of the data-storage disk at the start and finish of read/write operations. Specifically, parking the slider away from the disk prevents the slider and the head from dragging across the disk surface when the disk is rotating at a velocity insufficient to generate enough lift to support the slider. Drives that employ this storage methodology typically park the head in a location proximate the outer circumference of the disk. Parking the slider away from the disk is usually required in removable-media drives to facilitate insertion and removal of the data-storage disk.

Drives that park the data-transducing head away from the data-storage disk usually comprise a head-loading ramp. Head-loading ramps typically have an inclined surface and a flat. The suspension arm rests on the flat when the head is parked. The head-loading ramp is usually disposed proximate the outer circumference of the disk, with one end of the inclined surface overlapping the surface of the disk. The suspension arm is positioned on the ramp flat when the head is parked. The suspension arm slides down the inclined surface as the actuator moves the head from its parked position to a data transducing position. The sloped geometry of the inclined surface causes the gap between the head and the disk to undergo a gradual decrease as the head approaches the disk. Optimally, this decrease continues until the head assumes it normal flying height above the surface of the disk. The gradual decrease in the gap between the head and the disk provides an opportunity for the above-noted lifting force to develop between the air-bearing slider and the disk surface (this process is commonly referred to as "loading" the slider). Hence, under optimal circumstances, contact between the head and the disk does not occur during the loading process.

The ramp and the suspension arm function in a converse manner as the head is moved away from a data-transducing position. Specifically, the overlapping portion of the inclined surface slidably engages the suspension arm as the actuator moves the head toward the outer circumference of the disk. The sloped geometry of the inclined surface lifts the arm away from the surface of the disk. The motion of the suspension arm lifts the head by way of the flexure and the slider, thereby dissipating the lifting force between the slider and the disk surface (this process is commonly referred to as "unloading" the slider). The ramp continues to lift the arm and the head as the actuator moves the head away from the disk, until the head reaches its parked position.

The engagement of the head-loading ramp and the suspension arm generates a frictional force. This force is dependent upon the relative velocity between the ramp and arm. The frictional force is typically at its strongest prior to the point at which the suspension arm begins moving in relation to the ramp. The frictional force generated at this point is due primarily to static friction, i.e., friction between two non-moving surfaces. This type of friction is commonly referred to as "stiction." The frictional force between the ramp and the suspension arm undergoes an abrupt and substantial decrease as the arm begins moving. This decrease corresponds to a change in the type of friction acting between the ramp and the arm. More particularly, the frictional force generated by the slidable engagement of the ramp and the suspension arm is due primarily to coulomb friction, i.e., friction between two moving, non-lubricated surfaces. In general, the coulomb friction between two surfaces is substantially smaller than the static friction generated between the same two surfaces.

The motion of the data-transducing head as it moves between its parked and data-transducing positions is usually controlled by a servo controller, as noted above. These controllers typically employ a single, closed control loop to regulate the velocity of the head in relation to the data-storage disk. Precise control of the head's velocity is critical when the head is moved between the above-noted positions, as substantial velocity variations can cause the head to crash into the rotating data-storage disk. Such contact can damage the head and the disk, and can lead to a loss of data. Furthermore, substantial velocity variations as the head is being parked can cause the suspension arm to overshoot its parked position on the ramp, and can thereby damage the head, the slider, the flexure, or the suspension arm.

Variations in the velocity of the data-transducing head as it is moved between its parked and data-transducing positions can be caused by a number of factors. For example, variations may be caused by the effects of actuator inertia, aerodynamic interaction between the slider and the data-storage disk as the slider is loaded and unloaded, and changes in the slope of the head-loading ramp. In addition, changes in the above-noted frictional force between the ramp and the suspension arm exert a major influence on head velocity. In particular, the transition between static and coulomb friction as the arm begins to move generally results in a significant head-velocity change. Such changes can cause the head to undergo a velocity excursion that, due to the limitations of conventional closed-loop controllers, cannot be arrested in time to prevent the head from crashing into the data-storage disk.

Typical servo controllers regulate the velocity of the data-transducing head through the use of a corrective output based exclusively on a velocity error. More particularly, these controllers generate a velocity correction that is proportional to the difference between an actual (as measured) head velocity and a reference (desired) velocity. Some controllers also base the correction on the rate of change of this difference. Typical servo controllers are unable, however, to differentiate between the various sources that contribute to the velocity error. This inability represents a major drawback because, as explained in detail below, optimal head-velocity control requires that head-velocity corrections be tailored to the specific type of source that is responsible for the error.

The need for precise velocity control of the data-transducing head is becoming more critical due to current consumer-driven demands to reduce the form factor and data-access times of disk drives. More particularly, decreasing the form-factor of a drive necessitates reducing the footprints of the individual components within the drive. The footprint of a head-loading ramp can be reduced by increasing the ramp's steepness. Increased ramp steepness, however, decreases the precision with which a servo controller can regulate the velocity of the data-transducing head. Reducing data-access times requires an increase in the velocity at which the data-transducing head moves from its parked to its data-transducing positions. Increased head velocities make the need for precise velocity control more critical due to the above-noted potential for velocity excursions to damage the drive and the data-storage disk.

It is thus desirable to provide a disk drive with an improved ability to regulate the velocity of a data-transducing head while the head is moved between its parked and data-transducing positions. More specifically, the disk drive should have an improved ability to attenuate velocity variations in the head. The present invention addresses these goals.

SUMMARY OF THE INVENTION

The invention provides a disk drive for use with a rotatable data-storage disk. The drive comprises a data-transducing head that moves between a parked position and a data-transducing position. The head writes and/or reads data from and to the data-storage disk when disposed in a data-transducing position. The head is parked proximate the outer circumference of the data-storage disk when read/write operations are not underway in the drive. The drive further comprises an actuator mechanism that moves the head between its parked and data-transducing positions. The actuator mechanism comprises a suspension arm. The suspension arm is mechanically coupled to the data-transducing head so as to cause a cooperative movement between the head and the suspension arm. The actuator further comprises an actuator motor mechanically coupled to the suspension arm. The actuator motor generates an output that causes the cooperative movement between the suspension arm and the data-transducing head.

The disk drive further comprises a head-loading ramp that engages the suspension arm. This engagement generates a frictional force between the ramp and the arm.

The drive also comprises a servo controller. The servo controller is electrically coupled to the data-transducing head and the actuator motor. The controller regulates the velocity of the head as the head is moved between its parked and data-transducing positions. More particularly, the controller regulates the velocity of the data-transducing head so as to attenuate head-velocity variations caused by variations in the frictional force between the suspension arm and the head-loading ramp. The controller regulates the head velocity by calculating a friction-compensation factor based on a pre-determined relationship between the frictional force and the velocity of the head in relation to the head-loading ramp. In an alternative embodiment, the controller reads a friction-compensation factor from a pre-determined set of values relating the frictional force to the velocity of the head in relation to the head-loading ramp. The controller adjusts the output of the actuator motor in response to the friction-compensation factor.

The invention also provides a method for controlling a velocity of a data-transducing head in a disk drive for use with a rotatable data-storage disk. The data-transducing head is coupled to a suspension arm. The suspension arm engages a head-loading ramp as the data-transducing head is moved between a parked position and a data-transducing position within the drive.

The method comprises the step of measuring the velocity of the head in relation to the head-loading ramp. The method further comprises the step of calculating a friction-compensation factor based on a pre-determined relationship between the head velocity and a frictional force between the suspension arm and the head-loading ramp. In an alternative embodiment, the friction-compensation factor is read from a pre-determined set of values relating the frictional force to the velocity of the head in relation to the head-loading ramp. The method further comprises the step of adjusting the output of the actuator motor in response to the friction-compensation factor. The method results in the attenuation of head-velocity variations caused by variations in the frictional force between the ramp and the suspension arm.

BRIEF DESCRIPTION OF THE DRAWINGS

The foregoing summary, as well as the following detailed description of the preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings:

FIG. 2 is a diagrammatic view of a servo controller of the disk drive of FIG. 1;

FIG. 3 is a flow chart showing the operation of a friction-compensating control loop of the servo controller of FIG. 2;

DESCRIPTION OF PREFERRED EMBODIMENTS

Figure 1:
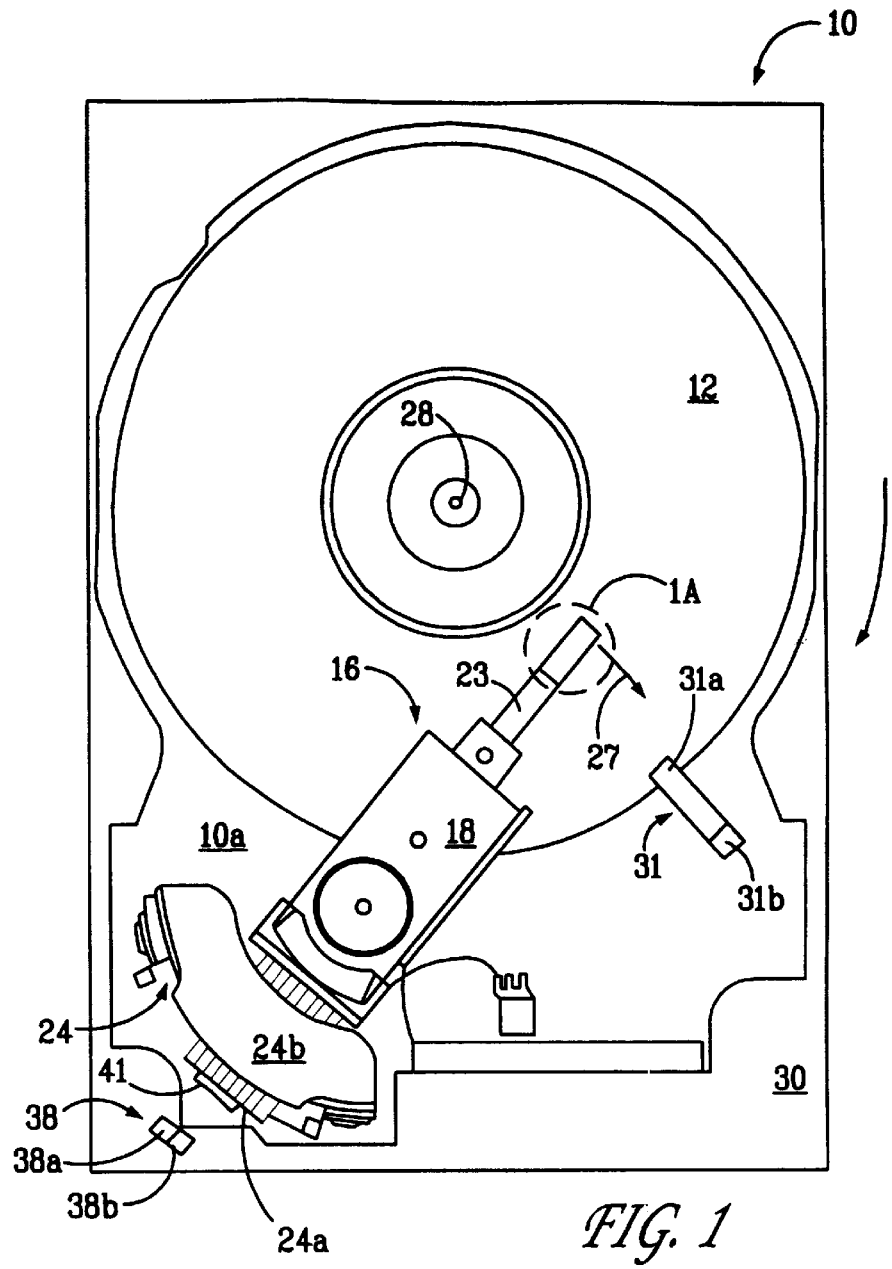
FIG. 1 is a top view of a disk drive adapted for use with the present invention, with a top cover of the drive removed.

A preferred embodiment of the invention is illustrated in FIGS. 1 through 5. The invention provides a disk drive 10 adapted for use with a rotatable data-storage disk 12. The data-storage disk 12 of the exemplary embodiment is a removable, hard, magnetic-type medium. The invention is equally applicable, however, to non-removable and floppy-type media. Furthermore, the invention can be used in conjunction with optical as well as magnetic media.

The disk drive 10 comprises a magnetoresistive read/write head 14. This particular type of data-transducing head is illustrated for exemplary purposes only, as the invention can readily be used in conjunction with other types of read/write and read-only heads. The head 14 is parked in a location away from the data-storage disk 12, proximate the outer circumference of the disk 12.

The head 14 is mechanically coupled to an actuator mechanism 16 as described in the Background of the Invention. More particularly, the head 14 is affixed to an air-bearing slider 17 that, in turn, is affixed to the actuator 16. The actuator 16 comprises an actuator arm 18, a flexure 21, a gimbal 22, and a suspension arm 23. The slider 17 is affixed to a first end 21a the flexure 21. An opposite end 21b of the flexure 21 is affixed to the suspension arm 23. The slider 17 and the head 14 are thereby suspended from the flexure 21 below the arm 23. The gimbal 22 is affixed to the suspension arm 23 directly above the slider 20, i.e., the gimbal 22 is located between the flexure 21 and the slider 17. The suspension arm 23 is affixed to the actuator arm 18. The actuator arm 18 is pivotally coupled to an internal surface 10a of the drive 10. The above-noted configuration causes the data-transducing head 14 to move cooperatively with the suspension arm 23.

The exemplary embodiment comprises one read/write head 14, and is adapted for operation with a single data-storage disk 12. This configuration is shown for illustrative purposes only, as the invention is equally applicable to drives 10 that are adapted for operation with multiple disks 12. Furthermore, the invention can be used in conjunction with drives 10 that comprise two heads 14 disposed on opposite sides of the disk 12.

The slider 17 is positioned proximate a surface of the disk 12 during read/write operations within the drive 10. The rotation of the disk 12 produces an aerodynamic boundary layer on the surface of the disk 12. An interaction between the slider 17 and the boundary layer produces a lifting force that urges the slider 17 (and the head 14) away from the disk 12. The lifting force drives the slider 17 into contact with the gimbal 22. The slider 17 contacts the gimbal 22 at a pivot point (not shown) on a surface of the slider 17. The resilient suspension arm 23, by way of the gimbal 22, thereafter exerts a spring force on the slider 17 that counteracts the lifting force. The slider 17 eventually reaches a height above the disk 12 at which the counteracting lift and suspension-arm forces are balanced. This height represents the flying height of the slider 17.

The gimbal 22 and the flexure 21 allow the slider 17 and the head 14 to undergo a limited amount of movement in relation to the suspension arm 23. Specifically, the slider 17 and the head 14 can move vertically as noted above. Furthermore, the slider 17 and the head 14 can undergo a limited degree of rotation about the pitch and roll axes of the slider 17, i.e., about a laterally-oriented axis and a longitudinally-oriented axis that each pass through the pivot point of the slider 17.

The actuator 16 further comprises an actuator motor 24. The motor 24 is a voice-coil motor comprising a movable coil 24a and a fixed permanent-magnet assembly 24b. The coil 24a is pivotally disposed within the magnetic field produced by the assembly 24b. The coil 24a is mechanically coupled to the actuator arm 18. The coil 24a is electrically coupled to a central processing unit (CPU) 26. The CPU 26 selectively directs electrical current through the coil 24a, thereby causing the motor 24 to generate an output. More specifically, the flow of current through the coil 24a drives the coil 24a through the magnetic field created by the assembly 24b. This movement, in conjunction with the pivotal mounting arrangement of the coil 24a, causes the coil 24a (and the motor 24) to generate a torque output. The motor 24 is described in detail for exemplary purposes only. The invention can also be utilized in conjunction with actuator motors that produce an output in the form of a linear force.

The torque output of the motor 24 causes the actuator arm 18 to rotate about the pivot point of the coil 24a. This motion causes the suspension arm 23 to translate along an arcuate path. The cooperative movement between the arm 23 and the data-transducing head 14, in turn, causes the head 14 to translate along an arcuate path 27 in relation to the surface of the data-storage disk 12. Although the drive 10 is described as comprising a voice-coil motor and a pivoting actuator arm 18, the invention is equally applicable to drives 10 that utilize a stepper-type motor and a linearly-translating actuator arm 18.

The drive 10 also comprises a spindle motor (not shown) that rotates the data-storage disk 12, and a spindle 28 through which the rotational torque of the spindle motor is transmitted to the disk 12. The various components of the drive 10 are enclosed within an outer casing 30.

According to an aspect of the present invention, the drive 10 further comprises a head-loading ramp 31 as described in the Background of the Invention. Head-loading ramps such as the ramp 31 are well known in the art. For example, head loading ramps 31 are described in U.S. Pat. No. 4,933,785 (Morehouse, et al.), U.S. Pat. No. 5,034,837 (Schmitz), U.S. Pat. No. 5,235,482 (Schmitz), and U.S. Pat. No. 5,831,786 (Boutaghou, et al.), each of which is incorporated herein by reference.

Figure 1A:
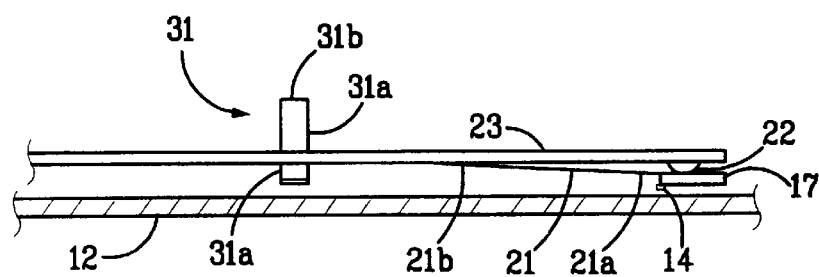
FIG. 1A is a magnified side view of the area 1A of FIG. 1.
Figure 5:
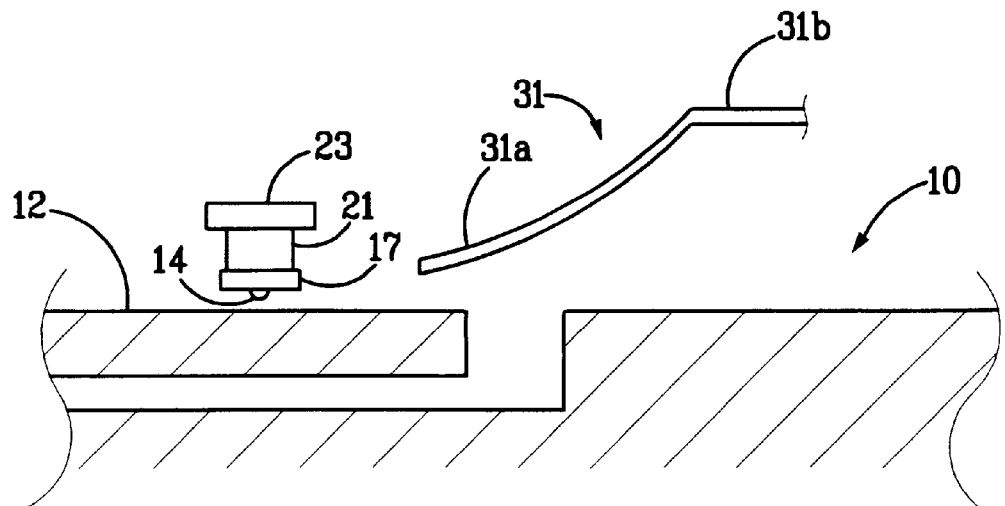
FIG. 5 is a diagrammatic view of a head-loading ramp of the disk drive of FIG. 1 from a front perspective.

The ramp 31 is disposed proximate the outer circumference of the data-storage disk 12. FIGS. 1A and 5 are diagrammatic illustrations that show an exemplary ramp 31 in detail. The ramp 31 has an inclined surface 31a and a flat 31b. The inclined surface 31a is adapted to slidably engage the suspension arm 23 as the read/write head 14 is moved between its parked and data-transducing positions (unless otherwise noted, references throughout the specification and claims to movement of the head 14 between its parked and data-transducing positions refer to movement both to and from each position). The suspension arm 23 is disposed on the flat 31b when the head 14 is parked. An end of the inclined surface 31a overlaps the surface of the data-storage disk 12. The suspension arm 23 slides off the flat 31b and down the inclined surface 31 a as the actuator 16 moves the head 14 from its parked position to a data transducing position. The sloped geometry of the inclined surface 31a causes the gap between the head 14 and the data-storage disk 12 to gradually decrease as the head 14 approaches the disk 12. This decrease continues until the head 14 is positioned at its normal flying height above the surface of the data-storage disk 12.

The ramp 31 and the suspension arm 23 function in a converse manner as the head 14 is moved away from a data-transducing position. Specifically, the overlapping end of the inclined surface 31a slidably engages the suspension arm 23 as the actuator 16 moves the head 14 toward the outer circumference of the data-storage disk 12. The sloped geometry of the surface 31a lifts the arm 23 away from the surface of the disk 12. The motion of the arm 23, in turn, lifts the head 14 by way of the flexure 21. The ramp 31 continues to lift the arm 23 and the head 14 as the actuator 16 moves the head 14 away from the disk 12, until the head 14 reaches its parked position.

The drive 10 further comprises a memory device 32, a memory array 34, a set of computer-executable instructions 36, and an optical sensor 38. The memory device 32 and the optical sensor 38 are electrically coupled to the CPU 23. The array 34 and the instructions 36 are stored on the memory device 32. The memory device 32 may be a RAM, ROM, PROM, EPROM, or similar chip or chip set. Alternatively, the memory device 32 may be a chip or chip set having registers for storing information.

The memory device 32, memory array 34, instructions 36, and CPU 26 form a servo controller 40, as shown in FIG. 2. The servo controller 40 is electrically coupled to the read/write head 14 and the actuator motor 24. The controller 40 regulates the velocity of the head 14 in relation to the data-storage disk 12 as the head 14 is moved between its parked and data-transducing positions. More particularly, the computer-executable instructions 36 instruct the CPU 26 to regulate the velocity at which the actuator motor 24 pivots the actuator arm 18, thereby controlling the relative velocity between the head 14 and the disk 12 (references to the velocity of the head 14 throughout the specification and claims, unless otherwise noted, pertain to the relative velocity between the head 14 and the disk 12, i.e., the rotational motion of the disk 12 is ignored).

The servo controller 40 comprises a primary servo loop 40a as described in the Background of the Invention. The controller 40 also incorporates a secondary control loop 40b that compensates for the frictional force generated by the engagement of the ramp 31 and the suspension arm 23. More particularly, the secondary control loop 40b regulates the output of the actuator motor 24 in a manner that accounts for the interdependence between this frictional force and the velocity of the head 14. Compensating for the frictional force in this manner enhances the precision with which the velocity of the head 14 can be controlled.

Figure 4:
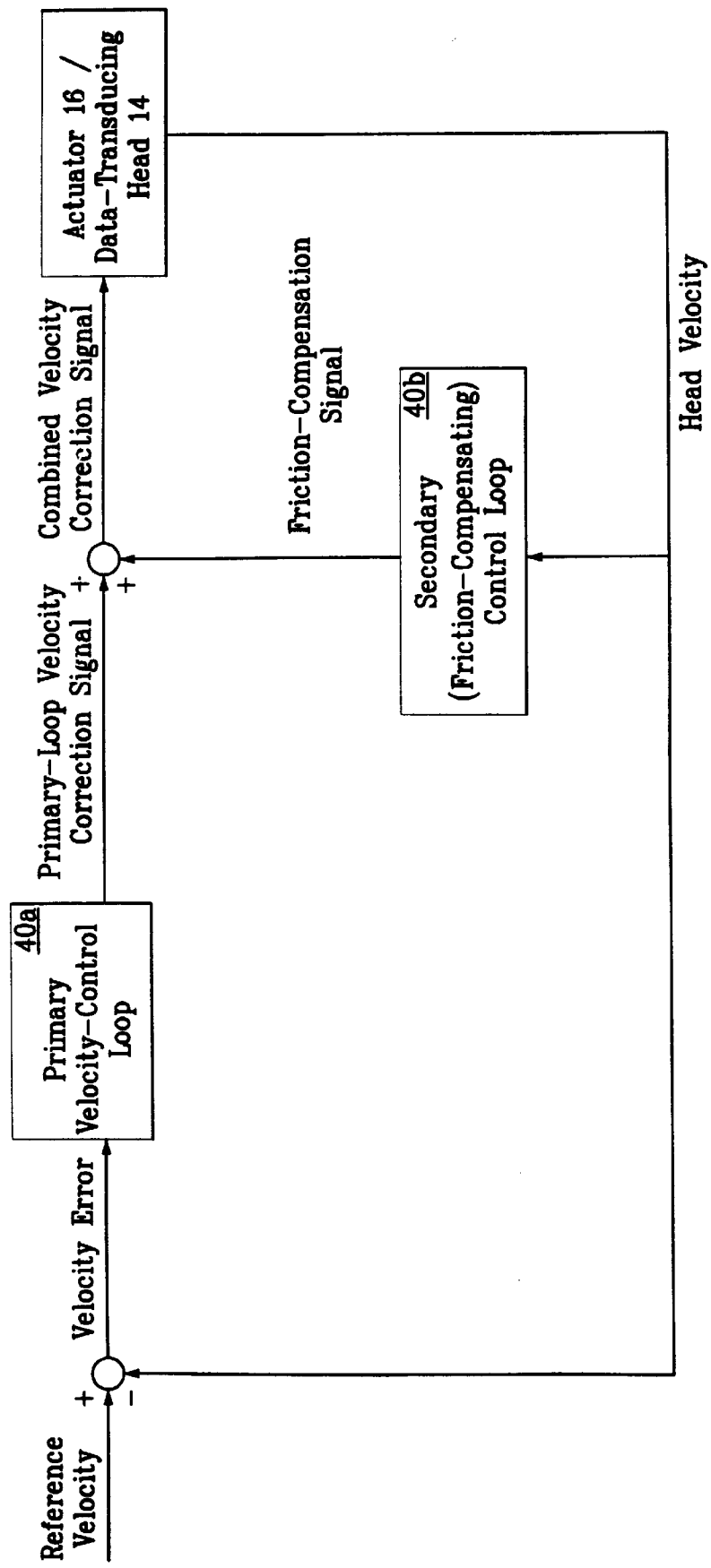
FIG. 4 is a block diagram of the servo controller of FIG. 2.

The operation of the secondary, i.e., friction-compensating, loop 40b of the servo controller 40 is shown in the form of a flow diagram in FIG. 3. FIG. 4 is a block diagram illustrating the overall operation of the controller 40. As stated above, the controller 40 regulates the velocity of the read/write head 14 as the head 14 is moved between a parked and a data-transducing position. The invention can be used in conjunction with a controller 40 that also regulates the velocity of the head 14 when the head 14 is in a data-transducing position, i.e., while the head 14 is writing and reading data to and from the disk 14. The controller 40 of the exemplary embodiment, however, does not perform this function. The velocity and position of the head 14 are regulated by a second controller (not pictured) when the head 14 is in a data-transducing position (step 202). The second controller operates independently of the controller 40, and utilizes a series of servo sectors embedded within the data tracks on the data-storage disk 12. The head 14 reads positional data from these servo-sectors when the head 14 is in a data-transducing position (the invention is equally applicable to drives 10 that utilize a separate disk surface and a separate head 14 to store and read servo-sector data).

The servo-sector data read by the head 14 is input to the second controller, which uses the information as positional feedback. More particularly, the second controller utilizes the servo data to determine the position of the head 14 in relation to the disk 12. The second controller subsequently adjusts the position and the velocity of the head 14 so as to place the head 14 in the desired data-transducing position in relation to the disk 12. The logic of the servo controller 40 prevents the controller 40 from regulating the velocity of the head 14 whenever the head 14 is in a data-transducing position, i.e., whenever the head 14 is in a position from which the head 14 can acquire servo data from the disk 12. Conversely, the controller 40 regulates the velocity of the head 14 when the drive 10 is activated and the head 14 is not in a data-transducing position.

The servo controller 40, when active, reads the velocity of the read/write head 14 in relation to the data-storage disk 12 and the head-loading ramp 31 (step 204). More particularly, the controller 40 reads the relative velocity of the actuator-motor coil 24a by way of the optical sensor 38. The coil velocity provides an indication of the velocity of the read/write head 14 because the head 14 and the coil 24a are coupled in the above-described manner.

The optical sensor 38 comprises an emitter 38a and a detector 38b. The emitter 38a functions as a source of irradiance. The detector 38b generates an output signal that is proportional to the intensity of irradiance incident upon the detector 38b. The sensor 38 is used in conjunction with an optical target 41. The target 41 is affixed to a surface of the coil 24a. The color of the target 41 varies from light to dark along a length of the target 41.

The irradiance generated by the emitter 38a is directed at the target 41 during operation of the sensor 38. The target reflects this irradiance toward the detector 38b. The intensity of the reflection is dependent upon the color of the particular area on the target 41 upon which the irradiance is incident. Hence, the output of the detector 38b varies depending on the area on the target 41 on which the irradiance from the emitter 38a is incident. Furthermore, the detector output varies at a rate proportional to the rate-of-change in the intensity of the reflection from the target 42. The rate-of-change in the reflective intensity, in turn, varies with the velocity at which the target 41 is moving in relation to the detector 38a. Thus, the velocity of the coil 24a (and the head 14) can be correlated with a rate-of-change in the output of the detector 38b.

In the exemplary embodiment, the output of the detector 38b is input to the CPU 26. The CPU 26 performs the above-noted correlation relating the rate-of-change in the detector output to the velocity of the coil 24a, thereby providing a measurement of the velocity of the head 14.

An alternative technique can be utilized to measure the velocity of the head 14. Specifically, the head velocity can be determined by measuring the so-called back-EMF through the coil 24a. Back-EMF is a voltage produced across the coil 24a as the coil 24a moves through the magnetic field generated by the magnet assembly 24b. The back-EMF is proportional to the velocity at which the coil 24a moves through the magnetic field, and thereby provides an indication of the velocity of the coil 24a (and the head 14). The back-EMF velocity-measurement technique is described in further detail in U.S. Pat. No. 4,864,437 (Crouse, et al.), which is incorporated herein by reference.

The velocity-measurement techniques described above are presented for exemplary purposes. The invention can readily be used in conjunction with other types of velocity-measurement techniques.

The controller 40 determines a to-be-applied friction-compensation factor based on the measured velocity of the head 14 in relation to the ramp 31 (step 206). The friction-compensation factor is a control input that is provided to the actuator mechanism 16. The engagement of the suspension arm 23 and the head-loading ramp 31 generates a frictional force, as noted previously. This force varies with the relative velocity between the ramp 31 and the arm 23 (hence, the frictional force also varies with the velocity of the read/write head 14 due to the coupling of the head 14 and the arm 23). The friction-compensation factor accounts for variations in the frictional force. More particularly, the compensation factor attenuates changes in the velocity of the arm 23 (and the head 14) caused by changes in the frictional force. This attenuation is accomplished by varying the output of the actuator motor 24 in accordance with a predetermined relationship between the frictional force and the velocity of the head 14 in relation to the ramp 31.

The friction-compensation factor is based on the above-noted friction-velocity relationship. The factor ties the friction-related output requirements of the motor 24 to the instantaneous velocity of the head 14 (as used in throughout the specification and claims, the term "friction-related output requirements" refers to the torque output that must be generated by the motor 24 to overcome the friction between the ramp 31 and the arm 23). In effect, the friction-compensation factor acts as a feed-forward control input that anticipates the friction-related output requirements of the motor 24 and adjusts the output of the motor 24 accordingly.

In one particular embodiment of the invention, a to-be-applied friction-compensation factor is calculated based on an equation set stored in the memory array 34. In an alternative embodiment, the compensation factor is read from a series of values stored and indexed in the array 34. Although neither method is preferred over the other, the choice of a particular method involves a trade-off between minimal memory requirements (calculation method) and computational simplicity (look-up method). The equation set or series of values is created in the following manner prior to the initial use of the disk drive 10.

The friction-compensation factor is based on the velocity-friction relationship between the ramp 31 and the head 14, as noted above. This relationship can be characterized in various ways. The choice of a particular characterization involves a trade-off between computational simplicity, memory requirements, and the degree of precision with which the velocity of the head 14 is to be controlled.

Figure 6:
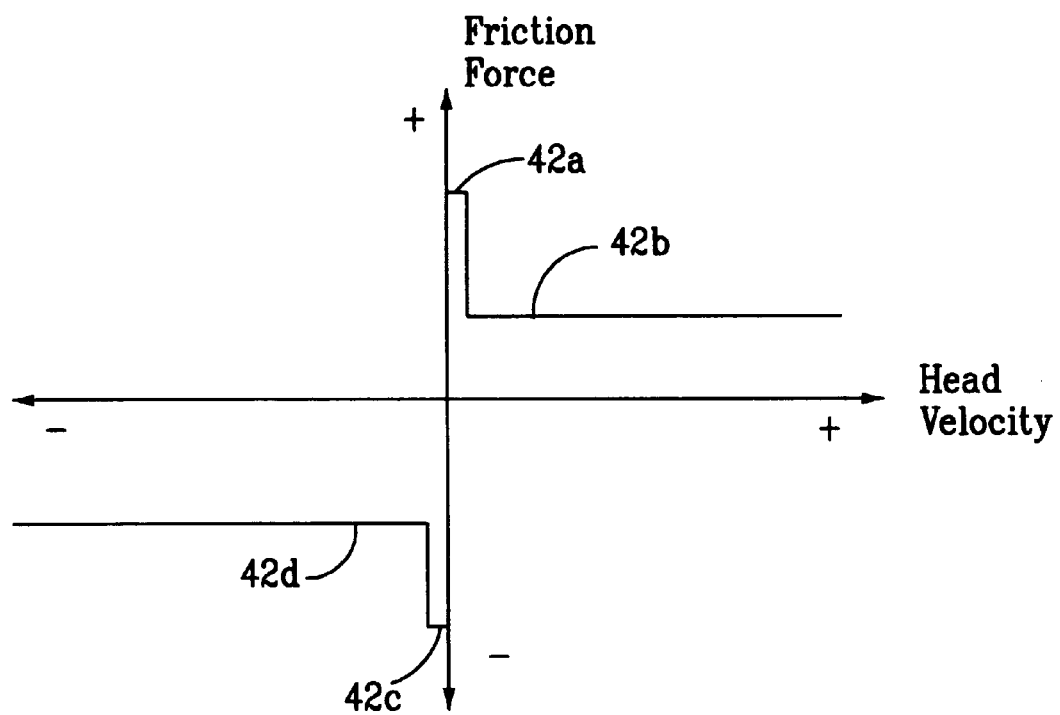
FIG. 6 is a diagrammatic view of a characterization of the velocity-friction relationship between a suspension arm and a head-loading ramp of the disk drive of FIG. 1.

The exemplary disk drive 10 incorporates a relatively simple characterization of the velocity-friction relationship. This relationship is illustrated in FIG. 6. The velocity-friction relationship is characterized as a step function 42, i.e., the friction force is characterized as a series of discrete values, with each value remaining constant over a particular range of head velocities. As shown in FIG. 6, the step function 42 comprises a first friction level 42a and a second friction level 42b. The first level 42a corresponds to head velocities at or near zero. The level 42a represents static friction between the ramp 31 and the arm 23 as the head 14 is initially moved from its parked position. The second level 42b corresponds to head velocities greater than those associated with the first level 42a. The level 42b represents coulomb friction between the ramp 31 and the arm 23 as the head 14 is moved toward a data-transducing position. The abrupt change in frictional force between the levels 42a and 42b reflects the substantial decrease in friction associated with the transition from static to coulomb friction. Furthermore, characterizing the coulomb friction as constant is a valid approximation, as coulomb friction typically remains substantially constant throughout the relatively low range of velocities at which the arm 23 translates. The levels 42c and 42d shown in FIG. 6 represent the frictional forces due to static and coulomb friction, respectively, as the head 14 is moved toward its parked position.

The velocity-friction relationship between the head-loading ramp 31 and the head 14 can be quantified experimentally, i.e., by measuring the actual frictional forces generated by the engagement of the arm 23 and the ramp 31 over the anticipated range of operating velocities for the arm 23. Alternatively, the velocity-friction relationship can be characterized theoretically based on the contact area, contact pressure, and coefficients of friction of the contact surfaces.

The velocity-friction relationship is subsequently scaled and modified for use in a servo-control system such as the controller 40. The result of this process is an equation that, when furnished with an input representing the velocity of the head 14, generates a friction-compensation factor. Alternatively, the scaling and modification process yields a series of friction-compensation factors that each correspond to a particular range of velocities for the head 14. Hence, during normal operation the controller 40 calculates or, alternatively, reads a to-be-applied compensation factor based on the measured velocity of the read/write head 14 (step 206).

The friction-compensation factor is added algebraically to a velocity-correction signal generated by the primary control loop 40a (step 208). As indicated by FIG. 4, the primary loop 40a generates a velocity-correction signal based on an input representing the velocity error. The velocity error corresponds to the difference between the measured velocity of the head 14 and a reference (desired) velocity. The reference velocity can be a single predetermined value. Alternatively, the reference velocity may be calculated as a function the position of the head 14 in relation to the disk 12.

The combined velocity-correction and friction-compensation signal is input to the actuator 16 (step 210). The portion of the signal representing the friction-compensation factor causes the motor 24 to counteract the frictional force corresponding to the measured velocity of the head 14. More particularly, the friction-compensation factor commands the motor 24 to generate a torque output that produces a particular force on the suspension arm 23. This force is substantially equal in magnitude to the instantaneous frictional force between the ramp 31 and the arm 23.

In effect, the controller 40 compensates directly for the effects of friction between the suspension arm 23 and the head-loading ramp 31. More particularly, the secondary loop 40a controls the velocity of the data-transducing head 14 based on a predetermined relationship between the head velocity and the noted frictional force. As stated previously, changes in this frictional force usually cause variations in the velocity of the head 14. Hence, by generating a corrective input based on the instantaneous frictional force, the controller 40 anticipates changes in the velocity of the head 14. The velocity correction implemented by the controller 40 arrests the velocity change before a substantial velocity error develops, thereby attenuating head-velocity excursions.

The benefits the controller 40 can be further appreciated by comparing the controller 40 to a typical single-loop controller as described in the Background of the Invention. Single-loop controllers, as noted previously, typically implement a velocity correction based solely on the instantaneous head-velocity error. These controllers, in general, do not account for differences in the sources of the velocity error.

Optimally, errors originating from different sources should be addressed with separate corrective inputs tailored to the specific source. For example, the actuator motor 24 must produce a relatively high output torque in order to overcome the static friction between the arm 23 and the head-loading ramp 31, and thereby move the head 14 from its parked position. As the arm 23 begins to move, however, the output of the motor 24 must be rapidly diminished to account for the reduced frictional force associated with the transition to coulomb friction. A conventional controller that generates a velocity correction based solely on a total velocity error may be unable to respond rapidly enough in this particular situation. More particularly, the response time of the conventional controller may be insufficient to arrest the velocity of the arm 23 and the head 14 before the head 14 overshoots its intended position and crashes onto the surface of the data-storage disk 12.

Tailoring the characteristics of a conventional closed-loop controller to account for the above-noted scenario, on the other hand, will generally cause the controller to overcompensate under other circumstances. For example, the loading of the slider 17 typically causes a relatively small variation in the velocity of the head 14. The change (and the rate of change) in the torque output of the motor 24 required to correct this minor variation differs significantly from that necessary to effectuate the noted friction-related correction. Hence, the response characteristics of a conventional controller must be compromised to some extent to allow the conventional controller to function under these varying conditions. The typical conventional controller thus provides less-than-optimal head-velocity control under most circumstances.

The controller 40, in contrast, generates a separate control input that accounts exclusively for head-velocity variations caused by friction between the ramp 31 and the arm 23. This control input is thus tailored to the specific error source which the input is intended to counteract. Tailoring the control input in this manner enhances the accuracy of the velocity correction, i.e., the correction will, in general, cause the head velocity to be adjusted closer to its desired value, for the reasons stated above. Furthermore, friction between the ramp 31 and the arm 23 is typically a major contributor to head-velocity excursions (particularly as the suspension arm 31 begins to move from its parked position). Hence, compensating for the frictional force with a dedicated control loop significantly enhances the precision with which the velocity of the head 14 is controlled.

The invention thus provides an improved servo controller 40 for regulating the velocity of the read/write head 14 as the head 14 is moved between a parked position and a data-transducing position. The controller 40 regulates the velocity of the head 14 with greater precision in comparison to prior-art controllers. The controller 40 is particularly beneficial when the frictional force between the head-loading ramp 31 and the suspension arm 23 undergoes a substantial change. In such instances, the precise velocity control provided by the controller 40 can avert potentially harmful contact between the head 14 and the data-storage disk 12. Furthermore, the enhanced precision of the controller 40 reduces the potential for the suspension arm 23 to overshoot its parked position on the ramp 31.

The enhanced precision of the controller 40 will allow the ramp 31 to be constructed with a steeper geometry than is currently possible. Increasing the ramp steepness reduces the footprint of the ramp 31, and can thereby lead to a decrease in the form factor of the drive 10. Furthermore, the velocity of the head 14 as it travels from its parked to its data-transducing positions can be increased, thereby reducing data-access times. Additionally, the controller 40 reduces friction-related wear on the ramp 31 and the arm 23 by eliminating or reducing head-velocity excursions. The controller 40 achieves these advantages with no additional hardware requirements in relation to prior-art closed-loop controllers. Furthermore, the controller 40 adds minimally to the memory and computational requirements of the disk drive 10.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed.

What is claimed is:

1. In a disk drive for use with a rotatable data-storage disk, a method for controlling a velocity of a data-transducing head mechanically coupled to a suspension arm while the head is moved by way of a head-loading ramp between a parked position and a data-transducing position, the method comprising the steps of:

measuring the head velocity in relation to the head-loading ramp;

calculating a friction-compensation factor based on a pre-determined relationship between the head velocity and a frictional force acting between the suspension arm and the ramp; and adjusting an output of an actuator motor coupled to the suspension arm in response to the friction-compensation factor, whereby variations in the head velocity caused by variations in the frictional force are attenuated.

2. The method of claim 1, wherein the predetermined relationship is a step function having a first level representing a first value for the frictional force and a second level representing a second value for the frictional force, the first value corresponding to the frictional force due to static friction between the head-loading ramp and the suspension arm and the second value corresponding to the frictional force due to coulomb friction between the head-loading ramp and the suspension arm.

3. The method of claim 1, further comprising the steps of generating a first control output based on a difference between a measured and a desired velocity of the data-transducing head, and generating a second control output based on the friction-compensation factor.

4. The method of claim 3, further comprising the steps of adding the first and the second control outputs algebraically to produce a combined output and inputting the combined output to an actuator mechanism of the disk drive.

5. A memory device bearing computer executable instructions for instructing a central processing unit to carry out the steps recited in claim 1.

6. A disk drive for use with a rotatable data-storage disk, comprising:

a head-loading ramp;

a data-transducing head moving between a parked position and a data-transducing position;

an actuator mechanism comprising:

a suspension arm mechanically coupled to the data-transducing head so as to cause a cooperative movement between the suspension arm and the head, the suspension arm engaging the head-loading ramp, the engagement generating a frictional force between the head-loading ramp and the suspension arm; and an actuator motor mechanically coupled to the suspension arm, the actuator motor generating an output that causes the cooperative movement between the suspension arm and the head; and a servo controller electrically coupled to the actuator motor and the data-transducing head, the controller calculating a friction-compensation factor based on a pre-determined relationship between the frictional force and a velocity of the head in relation to the ramp, and the controller adjusting the actuator-motor output in response to the friction-compensation factor, whereby the head velocity is controlled so as to attenuate variations in the head velocity caused by variations in the frictional force.

7. The disk drive of claim 6, wherein the predetermined relationship is a step function having a first level representing a first value for the frictional force and a second level representing a second value for the frictional force, the first value corresponding to the frictional force due to static friction between the head-loading ramp and the suspension arm and the second value corresponding to the frictional force due to coulomb friction between the head-loading ramp and the suspension arm.

8. The disk drive of claim 6, wherein the servo controller comprises a primary servo loop and a secondary control loop, the primary servo loop generating a first control output based on a difference between a measured and a desired velocity of the data-transducing head, the secondary control loop generating a second control output based on the friction-compensation factor.

9. The disk drive of claim 8, wherein the first and the second control outputs are added algebraically to produce a combined output, the combined output being input to the actuator mechanism.

10. The disk drive of claim 6, wherein the servo controller comprises a central-processing unit.

11. The disk drive of claim 6, wherein the actuator mechanism further comprises an actuator arm coupled to the actuator motor and the suspension arm, a flexure coupled to the suspension arm, and a gimbal coupled to the flexure.

12. The disk drive of claim 11, wherein the disk drive further comprises an optical sensor for measuring the head velocity.

13. In a disk drive for use with a rotatable data-storage disk, a method for controlling a velocity of a data-transducing head mechanically coupled to a suspension arm while the head is moved by way of a head-loading ramp between a parked position and a data-transducing position, the method comprising the steps of:

measuring the head velocity in relation to the head-loading ramp;

reading a friction-compensation factor from a pre-determined set of values relating the head velocity to a frictional force acting between the suspension arm and the ramp; and adjusting an output of an actuator motor coupled to the suspension arm in response to the friction-compensation factor, whereby variations in the head velocity caused by variations in the frictional force are attenuated.

14. The method of claim 13, wherein the predetermined set of values is based on a step function having a first level representing a first value for the frictional force and a second level representing a second value for the frictional force, the first value corresponding to the frictional force due to static friction between the head-loading ramp and the suspension arm and the second value corresponding to the frictional force due to coulomb friction between the head-loading ramp and the suspension arm.

15. The method of claim 13, further comprising the steps of generating a first control output based on a difference between a measured and a desired velocity of the data-transducing head, and generating a second control output based on the friction-compensation factor.

16. The method of claim 15, further comprising the steps of adding the first and the second control outputs algebraically to produce a combined output and inputting the combined output to an actuator mechanism of the disk drive.

17. A memory device bearing computer executable instructions for instructing a central processing unit to carry out the steps recited in claim 13.

18. A disk drive for use with a rotatable data-storage disk, comprising:

a head-loading ramp;

a data-transducing head moving between a parked position and a data-transducing position;

an actuator mechanism comprising:

a suspension arm mechanically coupled to the data-transducing head so as to cause a cooperative movement between the suspension arm and the head, the suspension arm engaging the head-loading ramp, the engagement generating a frictional force between the head-loading ramp and the suspension arm; and an actuator motor mechanically coupled to the suspension arm, the actuator motor generating an output that causes the cooperative movement between the suspension arm and the head; and a servo controller electrically coupled to the actuator motor and the data-transducing head, the controller reading a friction-compensation factor from a pre-determined set of values relating the frictional force to a velocity of the head in relation to the ramp, and the controller adjusting the actuator-motor output in response to the friction-compensation factor, whereby the head velocity is controlled so as to attenuate variations in the head velocity caused by variations in the frictional force.

19. The disk drive of claim 18, wherein the predetermined set of values is based on a step function having a first level representing a first value for the frictional force and a second level representing a second value for the frictional force, the first value corresponding to the frictional force due to static friction between the head-loading ramp and the suspension arm and the second value corresponding to the frictional force due to coulomb friction between the head-loading ramp and the suspension arm.

20. The disk drive of claim 18, wherein the servo controller comprises a primary servo loop and a secondary control loop, the primary servo loop generating a first control output based on a difference between a measured and a desired velocity of the data-transducing head, the secondary control loop generating a second control output based on the friction-compensation factor.

21. The disk drive of claim 20, wherein the first and the second control outputs are added algebraically to produce a combined output, the combined output being input to the actuator mechanism.

22. The disk drive of claim 18, wherein the servo controller comprises a central-processing unit.

23. The disk drive of claim 18, wherein the actuator mechanism further comprises an actuator arm coupled to the actuator motor and the suspension arm, a flexure coupled to the suspension arm, and a gimbal coupled to the flexure.

24. The disk drive of claim 23, wherein the disk drive further comprises an optical sensor for measuring the head velocity.

* * * * *